United States Patent
Lovchik et al.

(10) Patent No.: US 7,958,593 B2
(45) Date of Patent: Jun. 14, 2011

(54) WIPER MECHANISM

(75) Inventors: Christopher Scott Lovchik, Pearland, TX (US); Chris Rawls, League City, TX (US)

(73) Assignee: LHR Technologies, Inc., Pasadena, TX (US)

( * ) Notice: Subject to any disclaimer, the term of this patent is extended or adjusted under 35 U.S.C. 154(b) by 931 days.

(21) Appl. No.: 11/880,440

(22) Filed: Jul. 20, 2007

(65) Prior Publication Data
US 2009/0019658 A1    Jan. 22, 2009

(51) Int. Cl.
*B21B 28/00* (2006.01)
(52) U.S. Cl. ............................. 15/256.51; 15/246
(58) Field of Classification Search ............... 15/246, 15/256.51; 16/41; 280/158.1, 855, 856
See application file for complete search history.

(56) References Cited

U.S. PATENT DOCUMENTS

| | | | | |
|---|---|---|---|---|
| 158,885 A | * | 1/1875 | Barlow | 280/855 |
| 959,899 A | * | 5/1910 | Sweet | 104/279 |
| 1,460,236 A | * | 6/1923 | Ford | 111/54 |
| 1,688,250 A | * | 10/1928 | Thompson | 280/855 |
| 2,356,292 A | * | 8/1944 | Wildman | 280/856 |
| 2,585,914 A | * | 2/1952 | Carlton | 280/855 |
| 2,617,663 A | * | 11/1952 | Carlton | 280/855 |
| 3,318,432 A | * | 5/1967 | Mullis et al. | 198/321 |
| 3,866,539 A | * | 2/1975 | Gasser | 104/249 |
| 5,809,606 A | * | 9/1998 | MacDonald et al. | 15/160 |
| 6,859,988 B2 | | 3/2005 | Lovchik et al. | |
| 7,140,089 B2 | | 11/2006 | Lovchik et al. | |

OTHER PUBLICATIONS

U.S. Appl. No. 11/880,438, filed Jul. 20, 2007, entitled, "A Slip Sensor," by Christopher Lovchik.
U.S. Appl. No. 11/880,439, filed Jul. 20, 2007, entitled, "Workpiece Sensor," by Christopher Lovchik.

* cited by examiner

*Primary Examiner* — Randall Chin
(74) *Attorney, Agent, or Firm* — Trop, Pruner & Hu, P.C.

(57) ABSTRACT

In one embodiment, the present invention includes a protective member to be adapted about a roller of a moving assembly and to ride along a path of the roller. In this way, debris is prevented from contacting the roller. In one particular embodiment, the protective member may have an internal portion with a frusto-circular shape.

11 Claims, 5 Drawing Sheets

WIPER MECHANISM

BACKGROUND

Many machines such as computer numerically controlled (CNC) machines used for performing operations on varied workpieces such as metal workpieces, wood workpieces and so forth often operate in a hostile environment. For example, such machines may be exposed to extreme temperature conditions. Furthermore, such machines run in a relatively dirty environment owing to debris, particulate-sized and greater, that can be generated during the course of operations on workpieces. For example, in the context of a woodworking machine, various routing, carving, cutting and other operations can cause wood shavings, dust, debris and other undesired portions of a workpiece to build up in and around the machine.

Such debris can lead to catastrophic failures as well as more benign problems. Furthermore, such debris requires extensive resources such as manpower to remove the debris. Some systems go to great extents to provide vacuums and other cleaning devices to attempt to remove the debris. These solutions, however, can significantly increase the complexity, size and expense of a system. A need thus exists for improved manners of avoiding the ill effects of debris in a machine system such as a CNC.

SUMMARY OF THE INVENTION

In one embodiment, the present invention is directed to a protective member to be adapted about a roller of a moving assembly and to ride along a path of the roller. In this way, debris is prevented from contacting the roller. In one particular embodiment, the protective member may have an internal portion with a frusto-circular shape. The internal portion may include an annular protrusion to ride in a groove of the roller, and an external portion of the protective member at an open end of the frusto-circular shape includes a pair of sweeper members. In turn, the sweeper members each can include a channel portion to contact a rail member along which the moving assembly is to travel, and can be used to push debris from the rail member during movement of the moving assembly.

Multiple such protective members may be adapted about rollers that are part of a moving assembly to house a tool in a tool adapter. Accordingly, when the rollers, which are coupled on opposing sides of the moving assembly and mate with corresponding track members, move along an axis, the protective members prevent debris from contacting the rollers.

DETAILED DESCRIPTION

In various embodiments, a so-called wiper mechanism may be provided within a CNC machine to prevent debris from adversely affecting operation. More specifically, in some implementations a resilient clamp-type device may be adapted about various rollers present within a machine such that debris can be prevented from fouling a path of travel of the roller, which can lead to errors in operations performed by the machine, as well as more catastrophic effects, such as locking up of the machine or breaking of one or more components due to excessive force when a roller becomes locked due to debris interspersed between a roller and its corresponding travel member.

In many CNC-type machines, rollers are used to enable movement of assemblies such as tool assemblies, workpiece moving devices and so forth, along a rail, track, or similar roller travel mechanism. To prevent debris from affecting roller movement, a wiper device may be provided which may be adapted about the exposed portion of the roller. In some embodiments, the mechanism may snap into place about the roller to enable travel of the mechanism as the roller moves along the rail or other travel mechanism. In this way, the wiper mechanism may act to prevent the exposed portion of the roller from being contacted with debris. Furthermore, the wiper mechanism may act to push out or remove debris present along the direction of roller movement along the rail or other travel mechanism.

Figure 1:
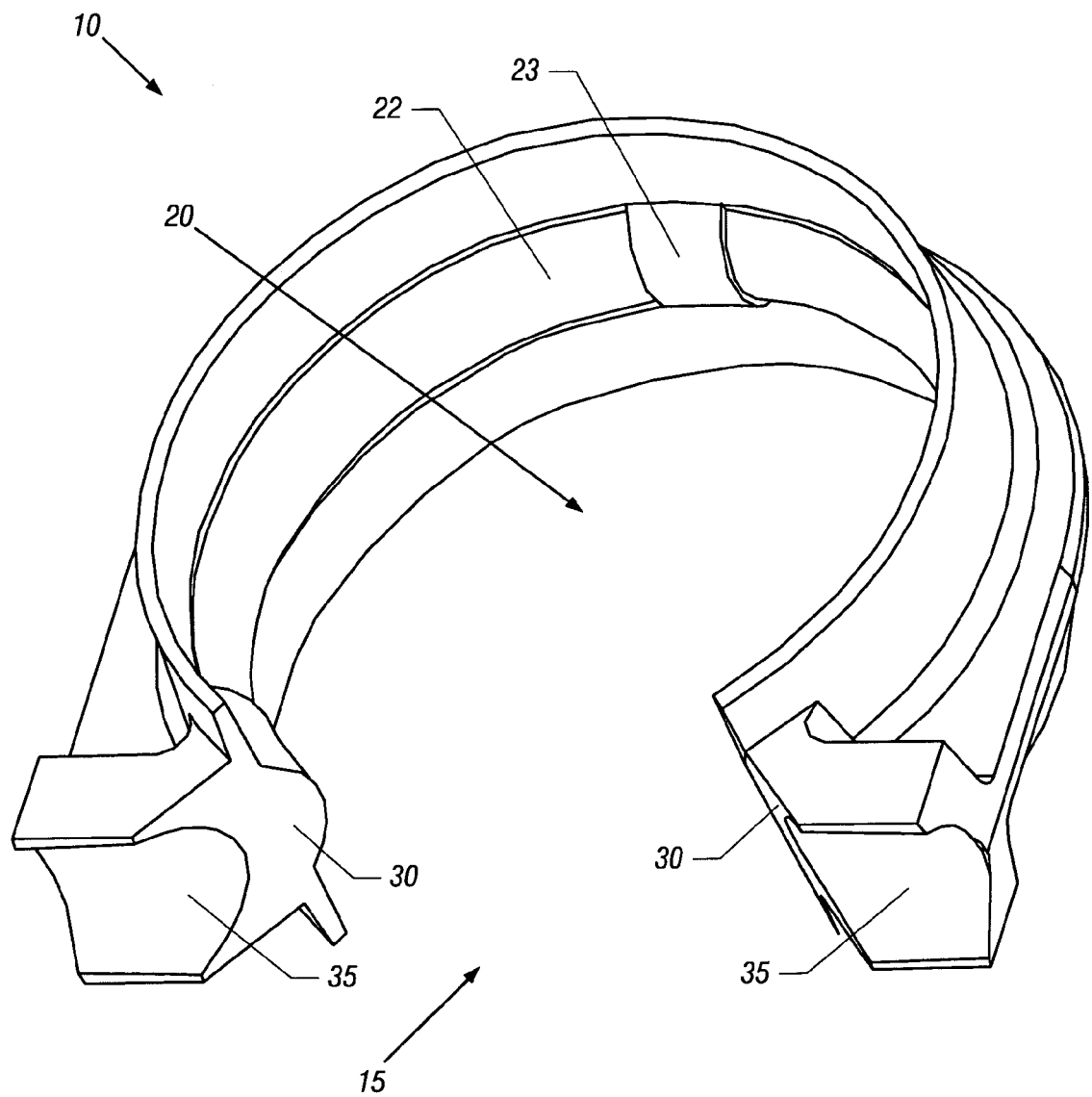
FIG. 1 is a perspective view of a wiper mechanism in accordance with one embodiment of the present invention.

Referring now to FIG. 1, shown is a perspective view of a wiper mechanism 10 in accordance with one embodiment of the present invention. As shown in FIG. 1, wiper mechanism 10 may be formed of a relatively resilient material such as a hard rubber, plastic or other polymer-based material. However, in other implementations wiper mechanism 10 may be formed of a suitable metal such as a soft metal material, or the like.

Figure 2B:
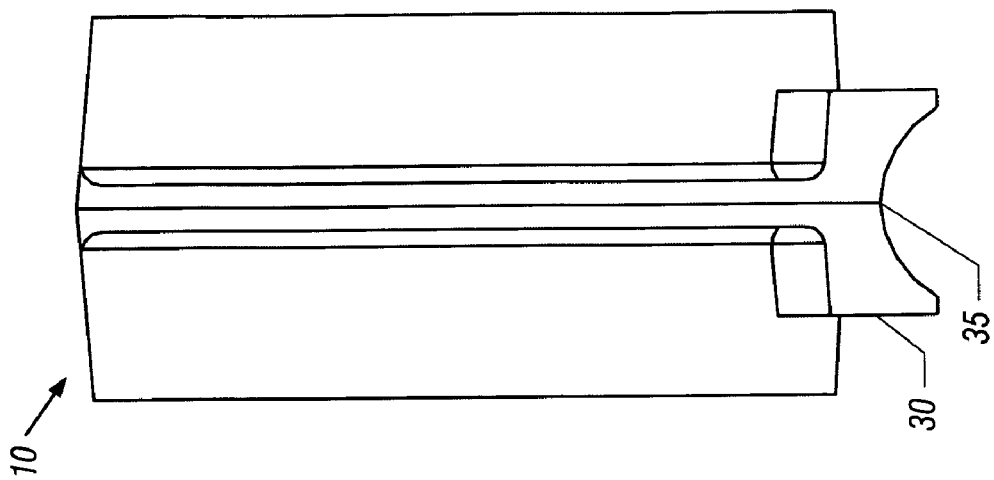
FIGS. 2A and 2B are side and cross-sectional views of the FIG. 1 embodiment.
Figure 2A:
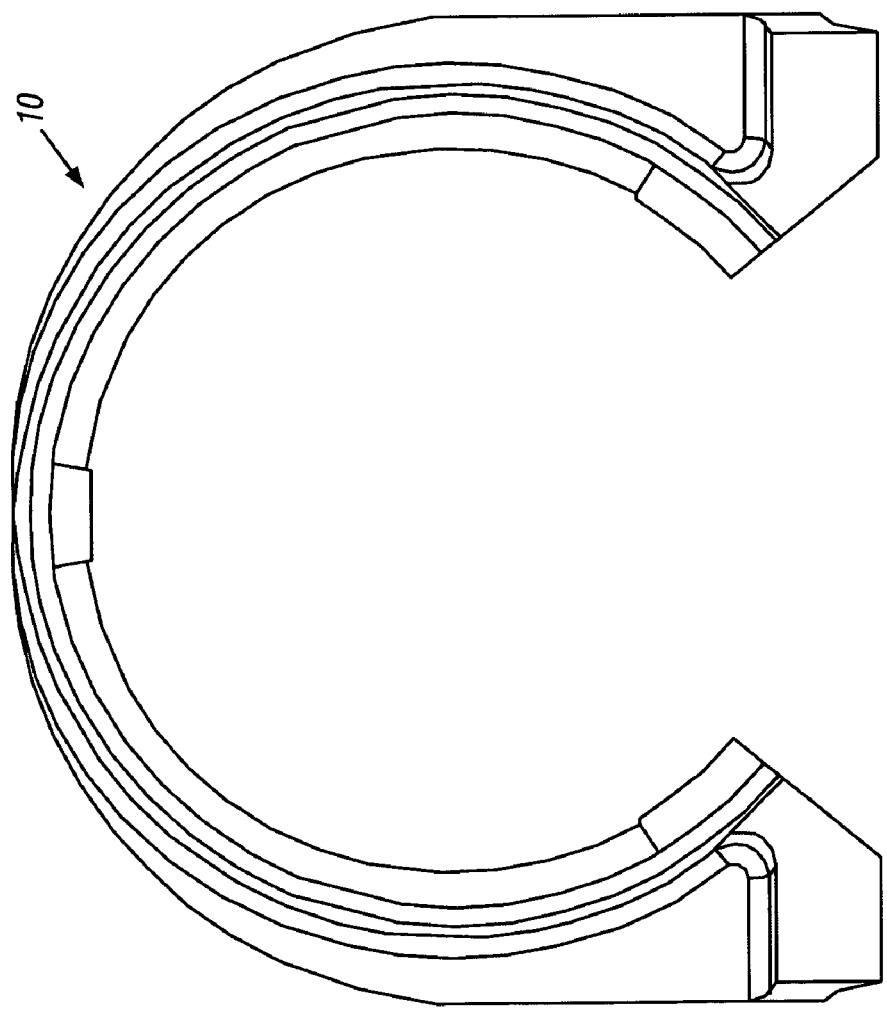

As shown in FIG. 1, wiper mechanism 10 may generally be in a frusto-circular or C-shaped form with an open region 15. To accommodate a corresponding roller, an interior portion 20 of mechanism 10 may have a profile with a protruding middle portion 22 which may rest in an indentation of a corresponding roller. Middle portion 22 may further include one or more belt protrusions 23. Note that a lower portion at both peripheries of open portion 15 may include rail matching members 30 to mate with a rail along which wiper mechanism 10 is to travel by movement of the corresponding roller. The matching members 30 may have a tapered profile from interior to exterior, as shown in the side view of FIG. 2A. In the embodiment of FIG. 1, the rail matching members 30 may have a generally semi-circular recess 35 or arch-like shape to enable contact with a corresponding rail mechanism. In this way, matching members 30 act as sweepers to sweep debris from along a path of the rail mechanism. Of course, in other implementations, different shapes for both rail matching members 30 as well as an internal portion 20 may be realized based on a roller/rail combination with which wiper mechanism 10 is to be adapted. FIG. 2B shows a cross-sectional view of the FIG. 1 embodiment, in which rail matching member 30 is shown more clearly.

While the scope of the present invention is not limited in this regard, in some implementations a wiper mechanism may be adapted to operate in a CNC machine such as the processor-controlled carving machine set forth in U.S. Pat. Nos. 6,859,988 and 7,140,089 commonly assigned herewith, and disclosures of which are hereby incorporated by reference.

Figure 3:
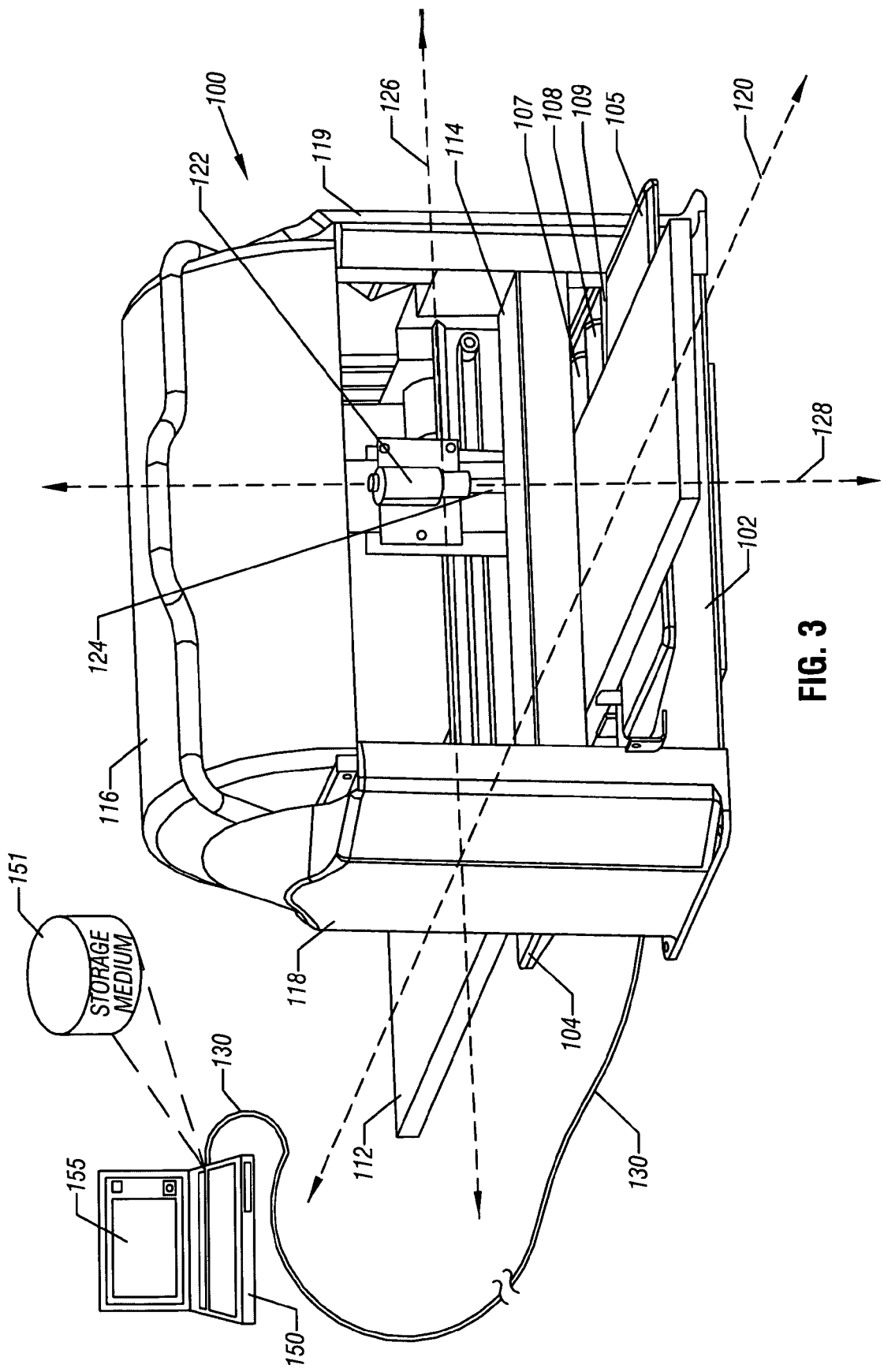
FIG. 3 is an overall view of a system in accordance with an embodiment of the present invention.

Referring now to FIG. 3, shown is an overall view of a processor controlled machine 100 which includes a base 102, feed trays 104 and 105, and lower rollers 107 and 109 (one lower roller obscured in FIG. 3) that together form a horizontal surface that supports and horizontally translates a workpiece 112, a head assembly 114, and top 116 and side 118, 119 covers that cover an internal frame that supports the head assembly 114 in a position above the workpiece 112. The head assembly 114 includes two clamping rollers (not shown in FIG. 3) that clamp the workpiece 112 between the clamping rollers and lower rollers 107, 109. The lower rollers are motor driven to translate the workpiece 112 both forward and backward in a horizontal, or x, direction 120. The head assembly 114 includes a cutting head assembly 122 that includes a bit adapter 124 that holds a drilling, cutting, shaping, routing, or other type of tool that is rotated and that is positioned onto, and moved across and into, the workpiece 112 in order to carve and shape the workpiece. While not shown in FIG. 3, cutting head assembly 122 may have one or more wiper mechanisms that are coupled about rollers of the assembly. The head assembly 114 includes lateral and vertical translation means to translate, under processor control, the cutting head assembly 122 in a lateral, or y, direction 126 and in a vertical, or z, direction 128, respectively. Similar wiper mechanisms may be present in head assembly 114.

Processor control of the cutting head assembly 122 in the y and z directions 126 and 128, and processor control of the workpiece 112 in the x direction 120, allows for arbitrary positioning of the cutting, drilling, shaping, routing, or other tool with respect to the workpiece 112 and for moving the drilling, cutting, shaping, routing, or other bit in arbitrary straight-lines, 2-dimensional curves, across 2-dimensional surfaces arbitrarily oriented in three dimensions, and in 3-dimensional curves in order to drill, cut, shape, and rout the workpiece in an almost limitless number of ways. Various sensors may communicate information regarding the positions and shapes of the workpiece 112. For example, the machine may include a load-sensing sensor that can sense and report to the processor the speed of the motor driving the rotation of the cutting head, so that the machine can adjust the weight of the workpiece and cutting-head assembly translation in order to maintain a relatively even load on a drilling, cutting, routing, shaping, or other type of bit.

The processor controller may be connected to a host PC or other computer system via a computer-connection cable 130. The processor is responsible for real-time control of the machine and for stand-alone control of the machine. In many applications, overall control of the machine may be the responsibility of a host computer system, such as host personal computer 150, interconnected with the processor via the computer-connection cable 130, shown in FIG. 3. The processor may thus monitor environmental inputs from various sensors included in the machine, which may include sensors to detect the shape and position of the workpiece, the load on the cutting head, temperature of various positions and of various components of the machine, and other sensors. The host PC 150 may generate command sequences based on stored designs, templates, and directives generated partially or completely as a result of interaction of a human user with the host PC 150, and transmits the commands to the processor, which then controls the components to effect each command. The processor facilitates safe operation of the machine by sensing, via various sensors embedded in the machine unsafe conditions, and shutting down one or more components, such as the motors driving rotation of the cutting head and translation of the workpiece and cutting-head assembly, to prevent catastrophic failures. The processor may include or be coupled to memory to store a variety of command sequences to allow for a command-based, stand-alone operation initiated and directed by a user through a control panel independent of host PC 150. The host PC 150 provides a GUI 155 that allows a user to draw, or compose, designs and templates reflecting an almost limitless number of combinations of elementary operations defined by a combination of a particular drilling, cutting, routing, shaping, or other bit with positions, lines, and curves. As shown in FIG. 3, a computer-readable storage medium 151 (schematically shown) may be coupled to host computer 150. Alternately, the machine may include one or more ports to receive removable storage media, to download one or more sets of instruction to control execution of operations on the machine.

Figure 4:
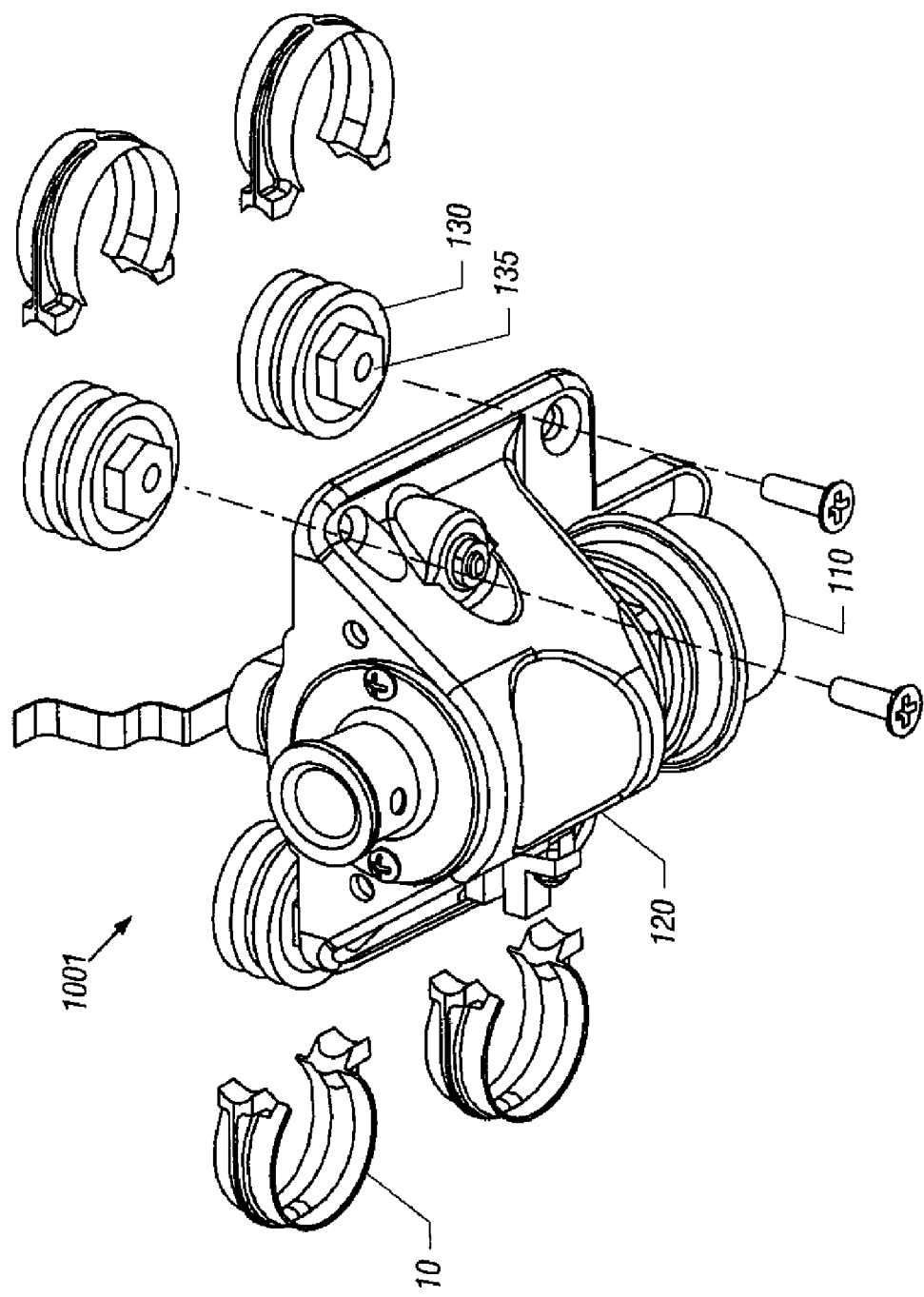
FIG. 4 is an exploded view of an assembly in accordance with one embodiment of the present invention.

Referring now to FIG. 4, shown is an exploded view of an assembly that provides support for a tool as well as to enable movement of the tool along an axis, e.g., a vertical axis of a machine. As shown in FIG. 4, an assembly 1001 includes a tool adapter 110 that is housed within a head assembly 120. A plurality of rollers 130 may be affixed to head assembly 120 by way of bearings 135. In the embodiment of FIG. 4, two pairs of rollers, adapted on either side of tool adapter 110 may be present. However, in other implementations differing numbers of such rollers may be present. For example, two rollers may be present on one side with a single roller generally located at a mid point between the opposing rollers can be used. While not shown in the embodiment of FIG. 4, understand that rollers 130 may enable movement of head assembly 120 along a vertical axis along rail members (not shown in FIG. 4).

Thus to prevent admission of debris into a path of rollers 130, each roller may have a wiper mechanism 10 adapted thereabout. As shown, wiper mechanism 10 may have a substantially circular mating surface that contacts the exposed portion of roller 130 as it moves. While shown with this particular implementation in the embodiment of FIG. 4, the scope of the present invention is not limited in this regard. That is, while shown as a vertical axis truck, other embodiments may be implemented in other moving assemblies as may be realized to enable movement along other axes or with rollers or other movers having different configurations. Furthermore, while described herein as rail members, understand that a travel surface may take many different configurations including a rail-shaped member, a track-shaped member, and so forth.

Figure 5:
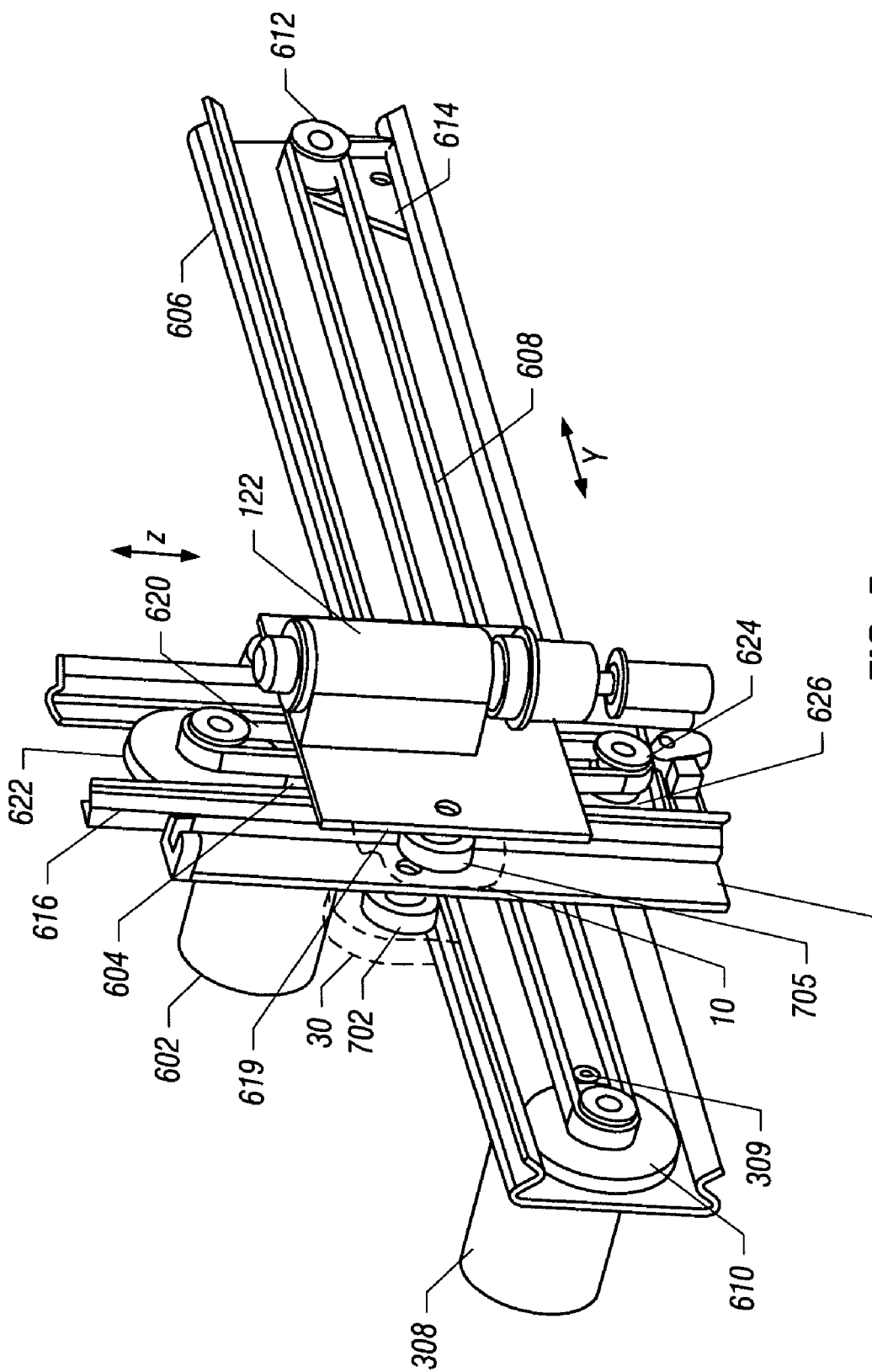
FIG. 5 is a perspective view of a y-and-z-axes assembly of a machine in accordance with one embodiment of the present invention.

Referring now to FIG. 5, shown is a perspective view of a y-and-z-axes assembly of a machine of one embodiment. As shown in FIG. 5, the y-axis tooth belt 608 is mounted to the y-axis drive gear and tooth pulley 610 and y-axis return pulley 612 to translate the y-axis truck assembly 618 in the y-direction. The y-axis tooth belt 608 is attached to the y-axis truck assembly 618 through a belt crimp. The y-axis truck assembly 618 rolls within the y-axis track via a number of ball-bearing rollers 702, one of which is partially shown in FIG. 5. Similarly, the z-axis truck assembly 619 is attached to the z-axis tooth belt 620 through a belt crimp to allow the cutting-head assembly 122 to be translated in the z-direction by rolling upwards and downwards in the z-track 616, driven by the z-axis axis drive motor 602 via the z-axis drive gear and tooth pulley 622. The z-axis tooth belt 620 is mounted to grooves in the z-axis drive gear and tooth pulley 622 and the z-axis tooth return pulley 624. The y-axis return pulley is mounted to the y-axis tensioner plate 614, in turn fixed to the y-axis track 606, and the z-axis return pulley 624 is mounted to the z-axis tensioner plate 626 that is in turn mounted to the z-axis track 616. As shown in FIG. 5, the z-axis drive-motor pinion 309 is rotated by the y-axis drive motor 308 and is enmeshed with the y-axis drive gear 610 to transfer mechanical rotation to the y-axis drive gear and tooth pulley 610. A similar configuration is used to transfer mechanical rotation from the z-axis drive motor pinion 604 to the z-axis drive gear and tooth pulley 622.

As further shown in FIG. 5, a first wiper mechanism 10 (shown in phantom in FIG. 5) may be adapted about a roller 705 that rides along a z-axis track 616, while a second wiper mechanism 30 (shown in phantom of FIG. 5) may be adapted about roller 702 that rides in a y-axis track 606. Note that second wiper mechanism 30 may be formed having a differently shaped lower portion to enable mating with the U-shaped y-axis track 606. Of course still other implementations are possible.

Thus a plurality of wiper mechanisms may be adapted about various bearing rollers to protect the rollers from debris when traveling along a track or other mover along which the rollers (and thus wiper mechanisms) travel. While shown with these particular implementations, the scope of the present invention is not limited in this regard. That is, other implementations may use a differently designed wiper mechanism to provide a snap-in cover around a roller that travels along a rail or other travel member.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a protective member to be adapted about a roller of a moving assembly and to ride along a path of the roller, the protective member to prevent debris from contacting the roller, the protective member having an internal portion including an annular protrusion to ride in a groove of the roller, the protective member having a frusto-circular shape with an open end.

2. The apparatus of claim 1, wherein an external portion of the protective member at the open end of the frusto-circular shape includes a pair of sweeper members.

3. The apparatus of claim 2, wherein the pair of sweeper members each include a channel portion having a semi-circular recess to contact a rail member along which the moving assembly is to travel, wherein the sweeper members are to push debris from the rail member during movement of the moving assembly.

4. The apparatus of claim 1, wherein the protective member is to be snapped about the roller, the protective member formed of a polymer.

5. An apparatus comprising:
a moving assembly to house a tool and to enable movement along at least a first axis, the moving assembly including:
a tool adapter to support the tool;
a first pair of rollers coupled on a first and second side of the moving assembly, the first pair of rollers to mate with corresponding track members to enable movement of the moving assembly along the first axis; and
a first pair of covers, each comprising a protective member adapted about one of the first pair of rollers to ride along the corresponding track member and to prevent debris from contacting the roller, the protective member to enclose the roller during movement, wherein the first pair of rollers each include a channel formed in a central portion of a periphery of the corresponding roller, the first pair of covers having corresponding protrusions in an internal portion of the cover to mate with the channel.

6. The apparatus of claim 5, further comprising a second pair of rollers coupled on the first and second sides of the moving assembly, the second pair of rollers to mate with the corresponding track members.

7. The apparatus of claim 6, further comprising a second pair of covers each to be adapted about one of the second pair of rollers.

8. The apparatus of claim 5, wherein the first pair of covers are to be snapped about the first pair of rollers.

9. An apparatus comprising:
a moving assembly to house a tool and to enable movement along at least a first axis, the moving assembly including:
a tool adapter to support the tool;
a first pair of rollers coupled on first and second sides of the moving assembly, the first pair of rollers to mate with corresponding track members to enable movement of the moving assembly along the first axis and including a channel formed in a central portion of a periphery of the corresponding roller; and
a first pair of protective members adapted about the first pair of rollers to prevent debris from contacting the first pair of rollers, each of the first pair of protective members having an internal portion with a frusto-circular shape and to ride along the corresponding track member and to enclose the corresponding roller during movement, and having corresponding protrusions in the internal portion to mate with the channel of the corresponding roller.

10. The apparatus of claim 9, further comprising a second pair of rollers coupled on the first and second sides of the moving assembly, the second pair of rollers to mate with the corresponding track members.

11. The apparatus of claim 10, further comprising a second pair of protective members each adapted about one of the second pair of rollers.

* * * * *